(12) United States Patent
Gneuss et al.

(10) Patent No.: US 10,040,049 B2
(45) Date of Patent: Aug. 7, 2018

(54) APPARATUS FOR MAKING POLYMERS

(71) Applicant: GNEUSS GMBH, Bad Oeynhausen (DE)

(72) Inventors: Stephan Gneuss, Bad Oeynhausen (DE); Daniel Gneuss, Charlotte, NC (US); Detlef Gneuss, Bad Oeynhausen (DE)

(73) Assignee: GNEUSS GMBH, Bad Oeynhausen (DE)

( * ) Notice: Subject to any disclaimer, the term of this patent is extended or adjusted under 35 U.S.C. 154(b) by 0 days.

(21) Appl. No.: 15/035,345

(22) PCT Filed: Nov. 12, 2014

(86) PCT No.: PCT/EP2014/074369
§ 371 (c)(1),
(2) Date: May 9, 2016

(87) PCT Pub. No.: WO2015/074929
PCT Pub. Date: May 28, 2015

(65) Prior Publication Data
US 2016/0303536 A1    Oct. 20, 2016

(30) Foreign Application Priority Data
Nov. 25, 2013  (DE) .................. 10 2013 019 611

(51) Int. Cl.
*B01J 19/00* (2006.01)
*B01J 19/18* (2006.01)
(Continued)

(52) U.S. Cl.
CPC ......... *B01J 19/0066* (2013.01); *B01F 7/0065* (2013.01); *B01F 7/00708* (2013.01);
(Continued)

(58) Field of Classification Search
CPC .. B01J 19/20; B01J 19/0066; B01J 2219/182; B01J 2219/1943; B01J 2219/1946
See application file for complete search history.

(56) References Cited

U.S. PATENT DOCUMENTS 3,244,485 A    4/1966  Coggeshall
3,347,528 A *  10/1967 Rouner .................. A21C 1/065
                                                    159/2.2
(Continued)

FOREIGN PATENT DOCUMENTS

CN    87100259 A    7/1988
DE       57700 B    9/1967

*Primary Examiner* — Lessanework Seifu
(74) *Attorney, Agent, or Firm* — Andrew Wilford

(57) ABSTRACT

The invention relates to a device for producing polymers, preferably for processing and polycondensation of polyester, having a substantially cylindrical reactor (1), which has an inlet opening (2) on one side and an exit opening (4) on the other side and an outlet (20) for discharging gases. According to the invention, said device is developed such that the device has a compact design, and such that the device allows the use of higher-viscosity initial substances, even when generating smaller volumes, which is optimally adjustable in respect of the process conditions thereof and which represents a variable, cost-effective solution. According to the invention, the reactor (1) has a continuous, central shaft (6), on which agitating elements or agitating elements and conveying elements are arranged, the inlet opening (2) is connected to an entry extruder (3), the shaft (6) of the reactor and the shaft (6) of the entry extruder (3) form a common shaft (6), and a drive (7) for the common shaft (6) is allocated to the entry extruder (3).

10 Claims, 1 Drawing Sheet

(51) Int. Cl.
*C08G 63/78* (2006.01)
*B01J 19/20* (2006.01)
*B01F 7/00* (2006.01)
*B01F 7/10* (2006.01)
*B01F 7/14* (2006.01)

(52) U.S. Cl.
CPC .................. *B01F 7/10* (2013.01); *B01F 7/14* (2013.01); *B01J 19/18* (2013.01); *B01J 19/20* (2013.01); *C08G 63/785* (2013.01); *B01J 2219/182* (2013.01); *B01J 2219/1943* (2013.01); *B01J 2219/1946* (2013.01)

(56) References Cited

U.S. PATENT DOCUMENTS

| | | |
|---|---|---|
| 3,618,903 A | 11/1971 | Ronner |
| 3,630,688 A | 12/1971 | Takiguchi |
| 5,100,240 A * | 3/1992 | D'Alterio ........... B01F 7/00008 366/156.1 |
| 5,599,507 A | 2/1997 | Shaw |
| 5,656,719 A | 8/1997 | Stibal |
| 6,162,837 A | 12/2000 | Gerking |
| 6,796,401 B2 | 9/2004 | Yoshii et al. |
| 7,279,535 B2 | 10/2007 | Konig |
| 7,513,677 B2 | 4/2009 | Gneuss |
| 7,550,116 B2 | 6/2009 | Wilhelm |
| 2011/0105716 A1 | 5/2011 | Stuetzle |

\* cited by examiner

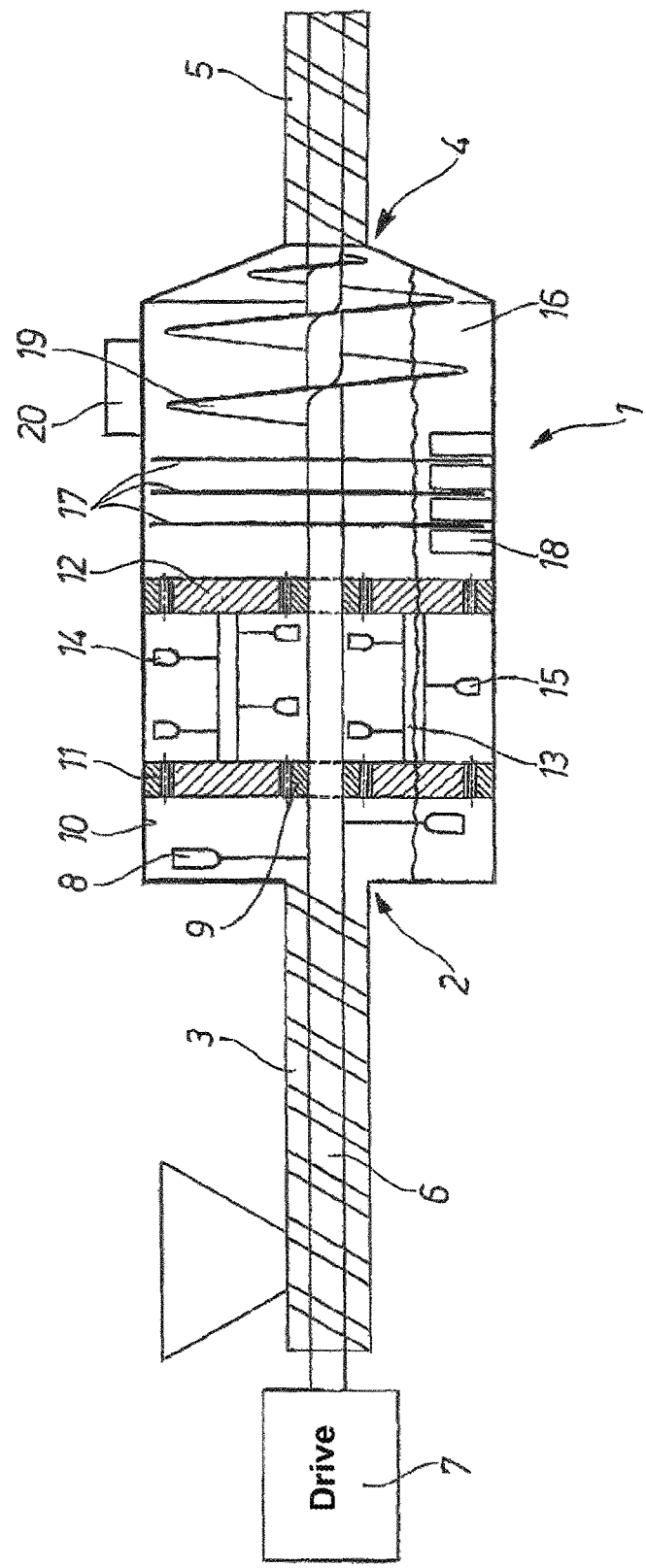

APPARATUS FOR MAKING POLYMERS

CROSS REFERENCE TO RELATED APPLICATIONS

This application is the US-national stage of PCT application PCT/EP2014/074369 filed 12 Nov. 2014 and claiming the priority of German patent application 102013019611.6 itself filed 25 Nov. 2013.

FIELD OF THE INVENTION

The invention relates to an apparatus for making polymers, preferably for processing and polycondensing polyesters with a reactor that on one side has an intake port and on the other side an outlet port as well as a vent for discharge of gases.

BACKGROUND OF THE INVENTION

Polymers, particularly polyesters, are produced on a large scale by means of reactors in accordance with DE 695 20 087 [U.S. Pat. No. 5,599,507] or DE OS 19 59 139 [U.S. Pat. No. 3,630,688]. Reactors of that kind are usually charged with low-viscosity to medium-viscosity starting substances with viscosities up to 10 Pas. Cages having stirring elements are provided in these known reactors. According to DE OS 19 59 139 the reactor additionally has two central shafts that carry the rotary cages.

If polymers or polyesters are to be produced in smaller quantities of, for example, only up to 2,000 kg/h and the starting substances in specific circumstances are also already of higher viscosity, for example with viscosities of approximately 100 Pas or even above that, then these reactors cannot be simply reduced to whatever size in order to still obtain polyesters of high quality. Added to that is the fact that high-power motors and large amounts of energy are needed for drive of the cages.

DE 198 11 280 [U.S. Pat. No. 6,162,837] in fact discloses a apparatus for recovery of linear polyester, in which high-viscosity starting materials can be used, but this apparatus, too, is complicated and has a space-consuming and energy-consuming construction.

U.S. Pat. No. 8,796,401 discloses a reactor that has stirring elements and conveying elements. However, this reactor has neither a vent for discharge of gases nor an intake extruder that is connected with the reactor by a common shaft and common drive. This reactor also serves for large-scale production of high-viscosity polymer materials.

DD 57 700 A5 discloses a method for producing polymerization and polycondensation products in which reactors of complicated construction are used. Apart from a charging chamber, a number of reaction chambers is provided here that makes the plant costly and that is not suitable for use for producing smaller amounts of polymers or polyesters.

In addition, US 2011/0105716 A1 discloses a serial arrangement of extruders and reactors that operate separately from one another and that are very complicated and costly. Use for production of smaller amounts of polymers or polyesters is not economically possible with plant of that kind.

DE 103 22 830 [U.S. Pat. No. 7,297,535] discloses a reactor for continuous polymerization of vinylmonomers as well as vinylpolymers. This reactor is constructed as a planetary roller extruder and manages entirely without an intake extruder.

If polymers, preferably polyesters, are to be produced in smaller quantities, the extruder for recovery of plastics material melts according to EP 1 434 680 [U.S. Pat. No. 7,513,677] has already proved satisfactory. Here, an intake extruder and a discharge extruder with a multi-worm extruder component are combined. Polycondensation or polymerization takes place in the multi-worm extruder component. However, the multi-worm extruder component still cannot be set in optimum manner particularly with respect to the processing conditions for polycondensation or polymerization that arise.

OBJECT OF THE INVENTION

The invention has the object of indicating a compact apparatus for making polymers, particularly for polycondensation of polyester, which even in the case of production of smaller amounts allows use of high-viscosity starting substances and is capable of optimum setting in the processing conditions thereof and represents a variable, economic solution.

SUMMARY OF THE INVENTION

For fulfillment of this object it is proposed that the reactor has a continuous shaft on which stirring elements or stirring elements and conveying elements are mounted, that the intake port is connected with an intake extruder, that the shaft of the reactor and the shaft of the intake extruder form a common shaft and that a drive for the common shaft is associated with the inlet extruder.

A more compact construction is possible through the connection of the inlet extruder with the reactor. Only one motor is needed that drives both the extruder unit and the reactor unit. Due to the fact that not only stirring elements, but also stirring and/or conveying elements are provided in the reactor, the polycondensation or polymerization can be better influenced than in a multi-worm extruder component.

A further drive motor can be saved if the outlet port is connected with a discharge extruder and if the shaft of the reactor and the shaft of the discharge extruder form a common shaft. However, there is also the possibility of coupling the outlet port of the reactor with a pump.

It is of advantage if the shaft of the reactor has external teeth and/or a key and if the external teeth and/or the key serves or serve for entraining the stirring elements or the stirring elements and conveying elements mounted on the shaft.

Through the provision of external teeth on the shaft of the reactor it is possible for stirring elements or stirring elements and conveying elements to be seated on a ring with a corresponding internal toothing and to be pushed onto the shaft of the reactor in respectively different sequences depending on requirements, so that the polycondensation or polymerization can be influenced in even more optimum manner.

In that case it is worthy of note that the stirring elements or the stirring elements and conveying elements can be plugged onto the shaft to be exchangeable, so that in the case of changing requirements or in the case or repair a rapid exchange of the relevant elements is possible.

Moreover, it is significant that at least one ring gear meshing with at least one planet gear is mounted at the inner wall of the reactor, that stirring elements or stirring elements and conveying elements are mounted on the shaft or at least one axle of the planet gear, and that the at least one planet gear is mounted in at least one entrainment element mounted on the shaft and/or meshes with at least one sun gear that is on the shaft of a planetary transmission.

The use of planet gears with consequently off-center stirring elements or stirring elements and conveying elements may further increase the possibilities of influencing the processing of synthetic material in the reactor.

It is recommended for the ring gears to be fixable to the inner wall of the reactor at freely selectable axial positions. A ring gear opposite a sun gear can thus be mounted at any desired position.

It is advantageous if disks are provided as stirring elements and if at least one stripper positionable at the reactor wall is associated with the disks.

These strippers can—like, for example, the ring gears—be positioned and fixed to the inner wall of the reactor at a desired position.

Exemplarily, the disk can be set at an inclination with respect to the shaft and/or can be corrugated and/or have surface-increasing elements such as nubs Through these measures it is possible, for example, to achieve even better and more sensitive influencing of the dwell time of the melt in the reactor, the layer thickness of the melt of the reactor, the temperature of the melt in the reactor, etc.

It has proved satisfactory to provide paddle-shaped elements as stirring and/or conveying elements, in which case forward conveying or rearward conveying, but also merely stirring, can be produced by selectable inclined setting of the paddle blades relative to paddle post and/or shaft.

It is recommended to provide helical elements as conveying elements. Thus, for example, a helical element of this kind in the form of a worm section can be provided at the outlet port and convey the melt out of the reactor.

A particular preference results if the stirring elements consist at least partly of wire mesh and/or perforated plates and/or support plates.

The polycondensation or polymerization can thus be influenced even more individually.

Exemplarily, the reactor is formed to be cylindrical or partly cylindrical and partly conical or, however, conical.

In that case, the reactor not only can taper conically toward its outlet port, but also can initially have a constant diameter increase over its length so that with an otherwise horizontal axis of the reactor the shearing force itself effects transport of the melt toward the outlet port.

If the reactor is capable of inclined setting by means of an inclination setting device from its arrangement with a horizontally disposed axis to an arrangement with at most a perpendicular axis and if every intermediate position of the inclined setting is presettable, preferably variably settable, the user of the reactor is afforded a further possibility of influencing the dwell time of the melt in the reactor.

If an upstream degasifier is associated with the inlet extruder, optionally even plastics material melts with higher viscosity can be fed to the reactor.

BRIEF DESCRIPTION OF THE DRAWING

The invention is explained in more detail in the sole FIGURE of a drawing.

SPECIFIC DESCRIPTION OF THE INVENTION

The FIGURE of the drawing shows a possible example of the construction of a reactor 1, at the intake port 2 of which an intake extruder 3 and at the outlet port 4 of which a discharge extruder 5 are flanged. Intake extruder 3, reactor 1 and discharge extruder 5 have a common shaft 6 rotationally driven by a motor 7.

Paddles 8 serving for stirring the melt from the intake extruder 3 are mounted on an upstream end of the shaft 6 in the reactor 1. Two sun gears 9 are mounted on the shaft 6 downstream of the paddles 8 in a flow direction of the melt. Ring gears 11 are mounted on the inner wall 10 of the reactor 1 level with the sun gears 9. Planet gears 12 are mounted between the ring gears 11 and the sun gears 9. Paddles 14 mounted on axles 13 of the planet gears 12, depending on the angle of their paddle blades 15, serve to stir the melt, advance it downstream, or pull it back upstream.

Downstream of the sun gears 9 on the shaft 6 are disks 17 that can have, like the paddle blades 15, holes, slots or wire mesh (not illustrated).

The outer peripheries of the disks 17 are outwardly surrounded by respective strippers 18 fastened to the inner wall 10 of the reactor 1. A helical element 19 serving for conveying the melt from the outlet port in the discharge extruder is provided at the end of the reactor. The reactor 1 is conically formed in the region of the outlet port so that the envelope curve of the helical element, which is basically of worm-shaped construction, is similarly conical.

The extruder has a vent 20 serving for discharge of gases. In that case, the optimal pressure for polycondensation or polymerisation in the reactor 1 can be set by a preferably regulatable vacuum pump (not illustrated).

Feeders, which are known per se, but not illustrated, for the reactor and/or the extruders are provided that can supply supplements, additives or chemically active substances to the starting material or the melt so as to be able to influence the molecular chains of the polymer in suitable manner. In particular, devices for measuring the viscosity as well as devices for controlling or regulating the addition of the supplements, etc., can also be provided in dependence on the results of the viscosity measurement. Devices, which are known as such and which similarly are not illustrated, for comminuting, homogenizing, compacting the charge material are upstream of the intake extruder and at the same time exert the necessary force for charging. Devices for melt filtration and/or for direct further processing of the polymers can obviously also be connected downstream of the plant.

The invention claimed is:

1. An apparatus for processing and polycondensing polyesters, the apparatus comprising:
    a reactor having on one side an intake port and on the other side an outlet port as well as a vent for the discharge of gases;
    a continuous central shaft;
    a sun gear on the shaft;
    stirring or conveying elements carried on the continuous central shaft in the reactor;
    an intake extruder connected to the intake port and surrounding the continuous central shaft upstream of the intake port;
    a drive for the continuous central shaft and on the intake extruder;
    ring gears fixed to the inner wall of the reactor at respective axial positions thereon;
    respective planet gears that mesh with the ring gears and with the sun gear and that have respective axles; and
    respective further stirring or conveying elements carried on the axles.

2. The apparatus according to claim 1, further comprising:
   a discharge extruder connected to the outlet port and surrounding the continuous central shaft of the reactor and of the intake extruder downstream of the reactor.

3. The apparatus according to claim 1, wherein the continuous central shaft has in the reactor external teeth or a key that rotationally drive the stirring elements and conveying elements on the shaft.

4. The apparatus according to claim 1, wherein the stirring or conveying elements can be pushed onto the shaft to be exchangeable.

5. The apparatus according to claim 1, further comprising:
   at least one disk forming a one of the stirring elements and
   at least one stripper positioned at the inner wall of the reactor and cooperating with the disk.

6. The apparatus according to claim 5, wherein the at least one disk is oriented at an inclination relative to the shaft and/or is corrugated and/or has surface-increasing elements.

7. The apparatus according to claim 1, wherein helical elements are provided as conveying elements.

8. The apparatus according to claim 1, wherein the stirring elements partly consist of wire mesh or perforated plates or slotted plates.

9. The apparatus according to claim 1, wherein the reactor is cylindrical or partly cylindrical and partly conical or conical.

10. An extruder assembly comprising:
    a common central shaft extending along a conveying direction;
    a reactor housing surrounding a portion of the shaft;
    stirring and conveying elements operatively connected to the shaft and in the reactor housing;
    an intake extruder surrounding the shaft upstream of the reactor housing; and
    a drive at the intake extruder for rotating the shaft and thereby extruding a melt from the intake extruder into an upstream end of the housing and moving the stirring and conveying element to mix and move the melt from the upstream end of the reactor housing in a conveying direction to and out of a downstream end of the reactor housing; and
   paddle-shaped blades serving as the stirring or conveying elements such that forward or rearward conveying, or merely stirring, can be produced by selectable inclined setting of the paddle blades relative to respective paddle posts or shafts.

\* \* \* \* \*